United States Patent
Senderos et al.

(10) Patent No.: US 12,111,330 B2
(45) Date of Patent: Oct. 8, 2024

(54) SYSTEMS AND METHODS FOR CONCURRENTLY EXPOSING A TEST SPECIMEN TO A FIRST ENVIRONMENT AND A SECOND ENVIRONMENT

(71) Applicant: The Boeing Company, Chicago, IL (US)

(72) Inventors: Bruno Zamorano Senderos, Huntsville, AL (US); Ali Yousefiani, Tustin, CA (US); Austin E. Mann, Chesterfield, MO (US); Michael F. Stoia, Rancho Santa Margarita, CA (US)

(73) Assignee: The Boeing Company, Arlington, VA (US)

( * ) Notice: Subject to any disclaimer, the term of this patent is extended or adjusted under 35 U.S.C. 154(b) by 358 days.

(21) Appl. No.: 17/673,085

(22) Filed: Feb. 16, 2022

(65) Prior Publication Data
US 2023/0258484 A1   Aug. 17, 2023

(51) Int. Cl.
*G01N 37/00*   (2006.01)
*G01D 21/00*   (2006.01)

(52) U.S. Cl.
CPC ............. *G01N 37/00* (2013.01); *G01D 21/00* (2013.01)

(58) Field of Classification Search
CPC ...... G01N 37/00; G01N 17/002; G01N 17/00; G01N 17/006; G01N 19/00; G01N 25/00; G01D 21/00; B64F 5/60
See application file for complete search history.

(56) References Cited

U.S. PATENT DOCUMENTS

| | | |
|---|---|---|
| 7,876,094 B2 | 1/2011 | Goldfine et al. |
| 8,209,133 B2 | 6/2012 | Darehbidi et al. |
| 2006/0177362 A1 | 8/2006 | D'Evelyn et al. |

(Continued)

FOREIGN PATENT DOCUMENTS

| | | | |
|---|---|---|---|
| CN | 108593198 | 9/2018 | |
| KR | 101 440 554 | 9/2014 | |
| KR | 101636692 B1 * | 7/2016 | ........... G01N 17/002 |

OTHER PUBLICATIONS

European Patent Office, "Partial European Search Report," App. No. 22199493.2 (Jul. 14, 2023).

(Continued)

*Primary Examiner* — Peter J Macchiarolo
*Assistant Examiner* — Timothy P Graves
(74) *Attorney, Agent, or Firm* — Walters & Wasylyna LLC

(57) ABSTRACT

A material compatibility test design system and method, allowing for the testing of characteristics of behavior of materials in extreme environments, the method including concurrently exposing a test specimen to a first environment and a second environment, the test specimen having an outside surface and an inside surface, the inside surface defining an internal volume, includes exposing the outside surface of the test specimen to the first environment for a predetermined period of time, the first environment comprising a first temperature, a first pressure and a first composition. The method further includes exposing the inside surface of the test specimen to the second environment for a second predetermined period of time, the second environment comprising a second temperature, a second pressure and a second composition.

20 Claims, 7 Drawing Sheets

(56) References Cited

U.S. PATENT DOCUMENTS

| | | | |
|---|---|---|---|
| 2011/0066388 A1* | 3/2011 | Snelling | G01N 17/04 |
| | | | 702/30 |
| 2013/0133434 A1* | 5/2013 | Rihan | G01N 17/006 |
| | | | 73/799 |
| 2017/0219553 A1* | 8/2017 | Radjy | G01N 25/00 |

OTHER PUBLICATIONS

European Patent Office, Extended European Search Report, App. No. 22199493.2 (Oct. 9, 2023).

* cited by examiner

SYSTEMS AND METHODS FOR CONCURRENTLY EXPOSING A TEST SPECIMEN TO A FIRST ENVIRONMENT AND A SECOND ENVIRONMENT

GOVERNMENT CONTRACT

This invention was made with Government support under contract number DE-AR0001124 awarded by Department of Energy. The government has certain rights in this invention.

FIELD

The present disclosure generally relates to testing materials and, more particularly, to methods and systems for concurrently exposing a test specimen to a first environment and a second environment, the second environment being different from the first environment.

BACKGROUND

Testing material systems at high temperatures, high pressures, and/or in corrosive environments faces several challenges. Many methods and systems are expensive, potentially expose personnel to hazardous conditions, and require sequentially testing at the various parameters rather than concurrently.

In order to truly test a material, such as a metallic, ceramic, or composite material, for long-term durability in extreme environments, it is desirable to test all conditions concurrently. Currently, very few solutions exist to evaluate such materials in the combined conditions of temperature, atmosphere, mechanical stress, and working fluid interaction.

Accordingly, those skilled in the art continue research and development in the field of concurrently testing materials in extreme environments.

SUMMARY

The following is a non-exhaustive list of examples, which may or may not be claimed, of the subject matter according to the present disclosure.

Disclosed are methods for testing materials after exposure to extreme conditions comprising concurrently exposing a test specimen to a first environment and a second environment, the test specimen having an outside surface and an inside surface, the inside surface defining an internal volume.

In one example, the disclosed method includes exposing the outside surface of the test specimen to the first environment for a predetermined period of time, the first environment comprising a first temperature, a first pressure and a first composition. The method further includes exposing the inside surface of the test specimen to the second environment for a second predetermined period of time, the second environment comprising a second temperature, a second pressure and a second composition.

Also disclosed are systems for testing materials after exposure to extreme conditions comprising concurrently exposing a test specimen to a first environment and a second environment, the first environment having a first fluid (e.g., a gaseous fluid) having a first composition at a first temperature and a first pressure, and the second environment having a second fluid having a second composition at a second temperature and a second pressure, the test specimen having an outside surface to be exposed to the first environment and an inside surface to be exposed to the second environment, the inside surface defining an internal volume of the test specimen.

In one example, the disclosed system includes a housing defining a chamber. The system further includes a first fluid source fluidly coupled with the chamber of the housing to supply the first fluid to the chamber. The system further includes a first pressure control apparatus associated with the first fluid source and configured to control, at least partially, the first pressure of the first fluid. The system further includes a second fluid source fluidly couplable with the internal volume of the test specimen to supply the second fluid to the internal volume of the test specimen. The system further includes a second pressure control apparatus associated with the second fluid source and configured to control, at least partially, the second pressure of the second fluid. The system further includes a heat source located in the housing, the heat source defining a heated chamber for receiving the test specimen, wherein the heated chamber is configured to control, at least partially, the first temperature of the first fluid and the second temperature of the second fluid.

DETAILED DESCRIPTION

Figure 1:
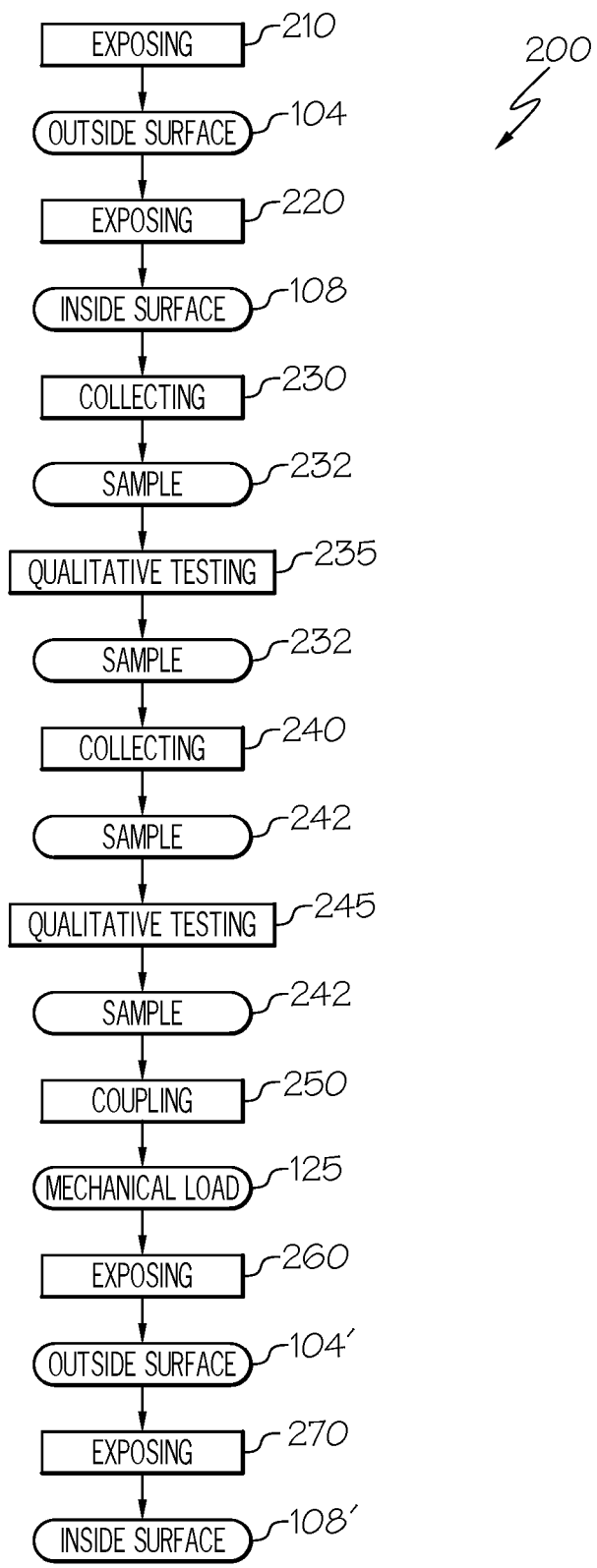
FIG. 1 is a flow chart of a method for concurrently exposing a test specimen to a first environment and a second environment.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The material compatibility test system 100 disclosed herein characterizes the behavior of materials at high temperatures, and, in examples, after exposure to extreme conditions, including exposure to supercritical $CO_2$. Material testing subjected to realistic conditions is necessary to validate the design performance of parts. Realistic pressure thickness temperature and stress distribution applied simultaneous can significantly improve the confidence in the use of those materials. The disclosed system 100 and method 200 simulate stresses comparable to the ones present in a heat exchanger, and allow for testing of those stresses, including creep measurements. The disclosed system 100 and method 200 allow for simultaneous testing of multiple specimens having the same or different geometries and chemistries and collection of data on each specimen to verify material compatibility at high temperature in the presence of supercritical CO2. The disclosed system 100 and method 200 further allow for selectively controlled testing conditions, including temperature and pressure, to avoid triple point and provide smooth changes in compressibility and specific heat as a result of changes in temperature. The system 100 and method 200 herein allow for uniform temperature on test specimens, in part, due to the use of forced air, which, in turn, allows for smaller gauge length.

The disclosed system 100 and method 200 provide a means for concurrently testing a material in extreme conditions including elevated temperature, elevated pressure, corrosive fluids including supercritical $CO_2$, fuel and other hydrocarbons, steam, halon materials and other fire extinguisher materials, etc. The disclosed system 100 and method 200 further provide a means for concurrently testing an inside surface 108 and an outside surface 104 of a test specimen 102 to two different environmental conditions. The disclosed system 100 and method 200 may be subject to vacuum conditions prior to introduction of environmental conditions including heat, pressure, and fluids in order to ensure controlled testing environments.

Referring to FIG. 1, disclosed is a method 200 for concurrently exposing a test specimen 102 to a first environment and a second environment, the test specimen 102 having an outside surface 104 and an inside surface 108, the inside surface 108 defining an internal volume.

In one example, the method 200 includes exposing 210 the outside surface 104 of the test specimen 102 to a medium, such as the first environment 122, for a predetermined period of time. The first environment 122 has a first temperature $T_1$, a first pressure $P_1$ and a first composition $C_1$. The first temperature $T_1$ may be selectively controlled via any means of heating based upon desired testing conditions. In one or more examples, the first temperature $T_1$ is about 800° C. to about 1000° C. In one example, the first environment 122 is ambient air or inert gas.

Figure 3:
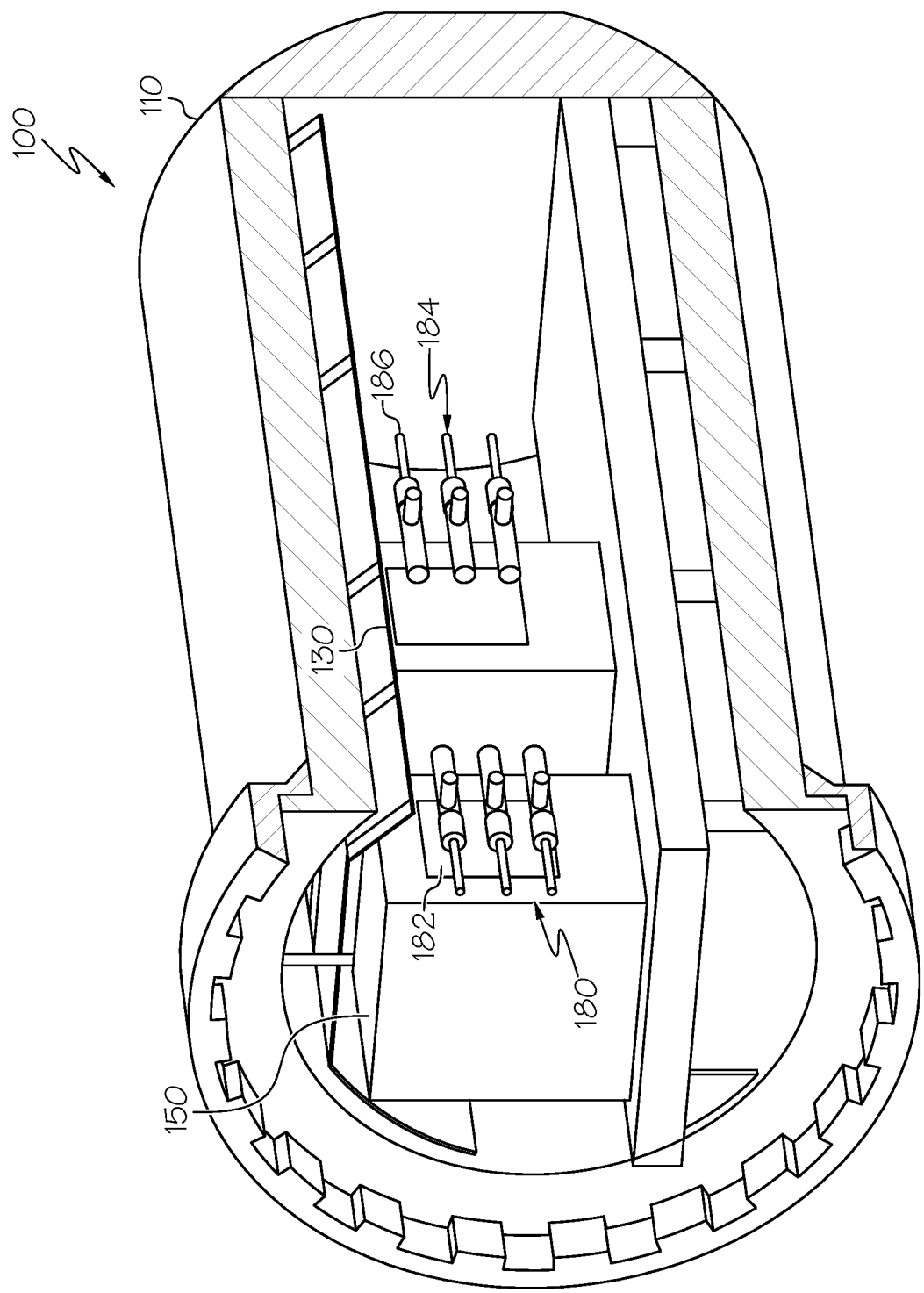
FIG. 3 is a perspective cross-sectional view of a portion of the system for concurrently exposing a test specimen to a first environment and a second environment.

The first pressure $P_1$ may be selectively controlled via any means of pressurizing based upon desired testing conditions, including a plurality of valves 180, see FIG. 3, and manifolds. In one or more examples, the first pressure $P_1$ is ambient or inert such that it is a medium. In another example, the first pressure $P_1$ is about 15 psi to about 2500 psi. in another example, the first pressure $P_1$ is about 1500 psi to about 2500 psi. Each valve 182 of the plurality of valves 180 may be individually adjustable based upon desired testing parameters.

The first environment 122 may include any fluid. In one example, the first environment 122 includes an inert gas. In another example, the first environment 122 comprises at least one of nitrogen and oxygen. In yet another example, the first environment 122 comprises a supercritical fluid. The supercritical fluid may include carbon dioxide. Further, the first environment 122 may include any fluid that yields an acidic pH.

Still referring to FIG. 1, the method 200 includes exposing 220 the inside surface 108 of the test specimen 102 to a medium, for example to the second environment 124, for a second predetermined period of time. The second environment 124 has a second temperature $T_2$, a second pressure $P_2$ and a second composition $C_2$. The second temperature $T_2$ may be selectively controlled via any means of heating based upon desired testing conditions. In one or more examples, the second temperature $T_2$ is about 800° C. to about 1000° C.

The second pressure $P_2$ may be selectively controlled via any means of pressurizing based upon desired testing conditions, including a second plurality of valves 184, see FIG. 3, and manifolds. The second pressure $P_2$ may be the same as the first pressure $P_1$ or may be different than the first pressure $P_1$. In one or more examples, the second pressure $P_2$ is about 1500 psi to about 2500 psi. Each valve 186 of the second plurality of valves 184 may be individually adjustable based upon desired testing parameters.

The second environment 124 may include any fluid. In one example, the second environment 124 includes an inert gas. In another example, the second environment 124 includes at least one of nitrogen and oxygen. In yet another example, the second environment 124 includes a supercritical fluid. The supercritical fluid may include carbon dioxide. Further, in another example, the second environment 124 includes a fluid that yields an acidic pH.

The first environment 122 and the second environment 124 have the first composition $C_1$ and the second composition $C_2$, respectively, which may be defined by any fluid present in each environment. In one example, the first composition $C_1$ is different from the second composition $C_2$. The first composition $C_1$ may be provided via a first fluid source 140 and may be selectively controlled via first pressure control apparatus 142, FIG. 2.

The test specimen 102 may include any material, including metallic, ceramic, and composite materials. In one example, the test specimen 102 includes a refractory alloy. In another example, the test specimen 102 includes a nickel-based superalloy. In yet another example, the test specimen 102 includes a ceramic material. In one specific example, the test specimen 102 includes HAYNES 282 alloy.

Figure 5:
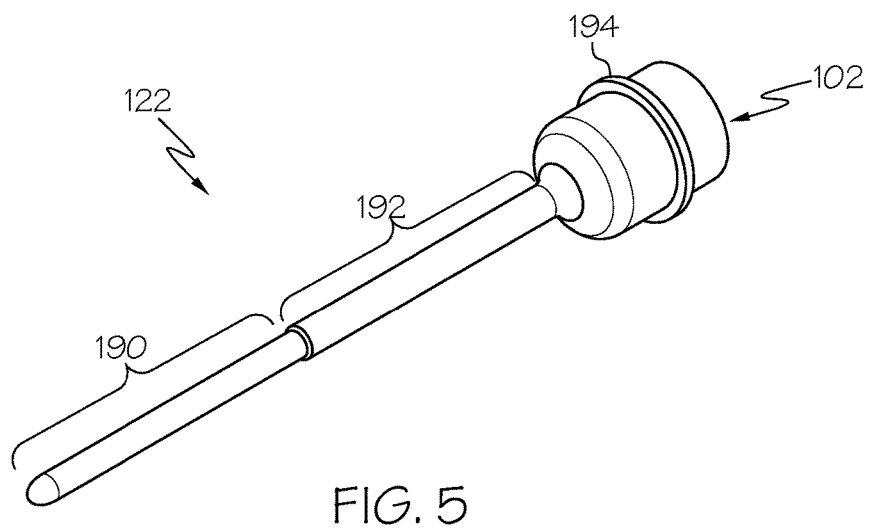
FIG. 5 is a perspective view of the test specimen of the system of FIG. 4.
Figure 6:
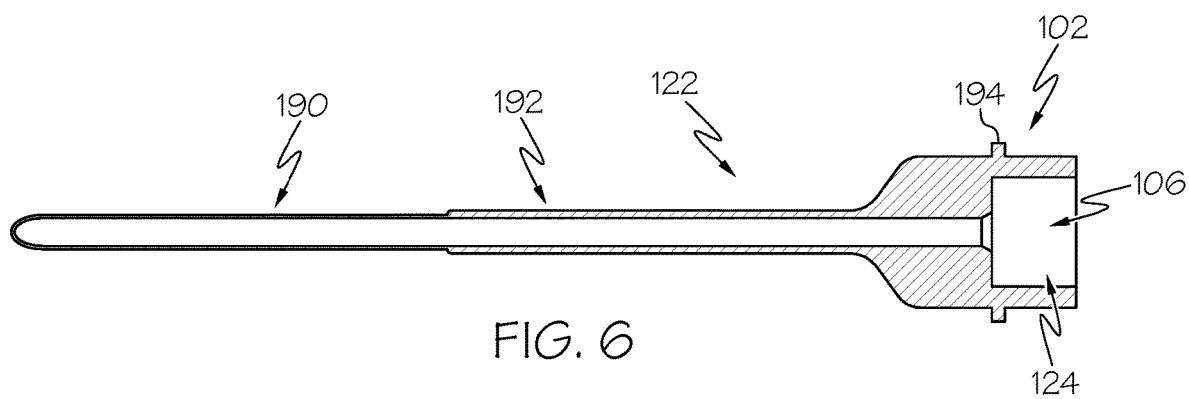
FIG. 6 is a cross-sectional view of the test specimen of FIG. 5.

Referring to FIG. 5 and FIG. 6, in one or more examples, the test specimen 102 is tapered. Wall thickness of the test specimen 102 is representative of the manufacturing process. For example, the test specimen 102 may have a first thickness, the first thickness is representative of the wall thickness of the portions for testing and adding fidelity to the properties of the material. The test specimen 102 may further have a second thickness to ensure that there is not failure outside the furnace (thick enough to not to fail) but thin enough to limit the heat exchange. In one example, the first thickness is about 10 to 20 thousandths of an inch, and the second thickness is at least 40 thousandths of an inch.

In one or more examples, the test specimen 102 has a wall thickness of about 0.01 inches to about 0.020 inches, such as from about 0.01 inches to about 0.014 inches. The test specimen 102 may be about 8" long and have an outside diameter of about 0.65" and an inside diameter of about 0.4". The test specimen 102 has a testing portion or gauge length 190, see FIG. 5 and FIG. 6, that may be about 2" to about 3" in length and have a wall thickness of about 0.020 inches. The test specimen 102 may further have a mid-portion 192 that is about 3" to about 4" in length and has a greater wall thickness than the wall thickness of the testing portion or gauge length 190. The geometry of the test specimen 102 may be comparable to that of a part manufactured by additive manufacturing.

The amount of second pressure $P_2$ introduced may be a function of the geometry of the test specimen 102. For example, a range of about 13 KSI to about 21 KSI may be interested when the test specimen 102 has an inner diameter of about 0.25". In another example, a range of about 20 KSI to about 30 KSI may be interested when the test specimen 102 has an inner diameter of about 0.4". In another example, a test specimen 102 having a tin thickness of about 0.010 inches may have a second pressure $P_2$ of about 18 KSI to about 45 KSI. Other factors may determine wall thickness of the test specimen 102, such as oxygen diffusion rate.

The first predetermined time and the second predetermined time may be any desired time for testing under desired conditions. In one example, the first predetermined time is at least 1000 hours and the second predetermined time is at least 1000 hours.

Still referring to FIG. 1, the method 200 may further include coupling 250 a mechanical load 125 to the test specimen 102 during the exposing 210 the outside surface 104 of the test specimen 102 and the exposing 220 the inside surface 108 of the test specimen 102. The coupling 250 may be performed to further test the test specimen 102 for strength-related material properties when exposed to various corrosive and extreme environments.

Referring to FIG. 1, the method 200 may further include collecting 230 a sample 232 from the first environment 122. The sample 232 may be drawn from the first environment 122 at any point during testing. Additionally, after the collecting 230, the method 200 may further include qualitative testing 235 the sample 232 from the first environment 122. The qualitative testing 235 may determine if any reactions have occurred in the first environment 122 due to the combined conditions of the first composition $C_1$, first temperature $T_1$, first pressure $P_1$, and the composition of the test specimen 102.

Still referring to FIG. 1, the method 200 further includes collecting 240 a sample 242 from the second environment 124. Additionally, after the collecting 240, the method 200 includes qualitative testing 245 the sample 242 from the second environment 124. The qualitative testing 245 may determine if any reactions have occurred in second environment 124 due to the combined conditions of the second composition $C_2$, second temperature $T_2$, second pressure $P_2$, and the composition of the test specimen 102.

The method 200 may be implemented with more than one test specimen 102. For example, as shown in FIG. 1, the method 200 may include exposing 260 an outside surface 104' of a second test specimen 102' to the first environment 122 for a predetermined period of time.

The method 200 may further include exposing 270 an inside surface 108' of the second test specimen 102' to a third environment 126 for a predetermined period of time, the third environment 126 having a third temperature $T_3$, a third pressure $P_3$ and a third composition $C_3$. In one or more examples, the exposing 210 the outside surface 104 of the test specimen 102 and the exposing 260 the outside surface 104' of the second test specimen 102' are performed concurrently. The second composition $C_2$ may be different from the third composition $C_3$.

The test specimen 102 and the second test specimen 102' may include any materials selected for a particular test and may be of the same composition. In one example, the test specimen 102 and the second test specimen 102' are compositionally different. Further, the test specimen 102 and the second test specimen 102' may both be metallic or ceramic or, alternatively, one of the test specimen 102 and the second test specimen 102' may be metallic and the other ceramic.

Figure 2:
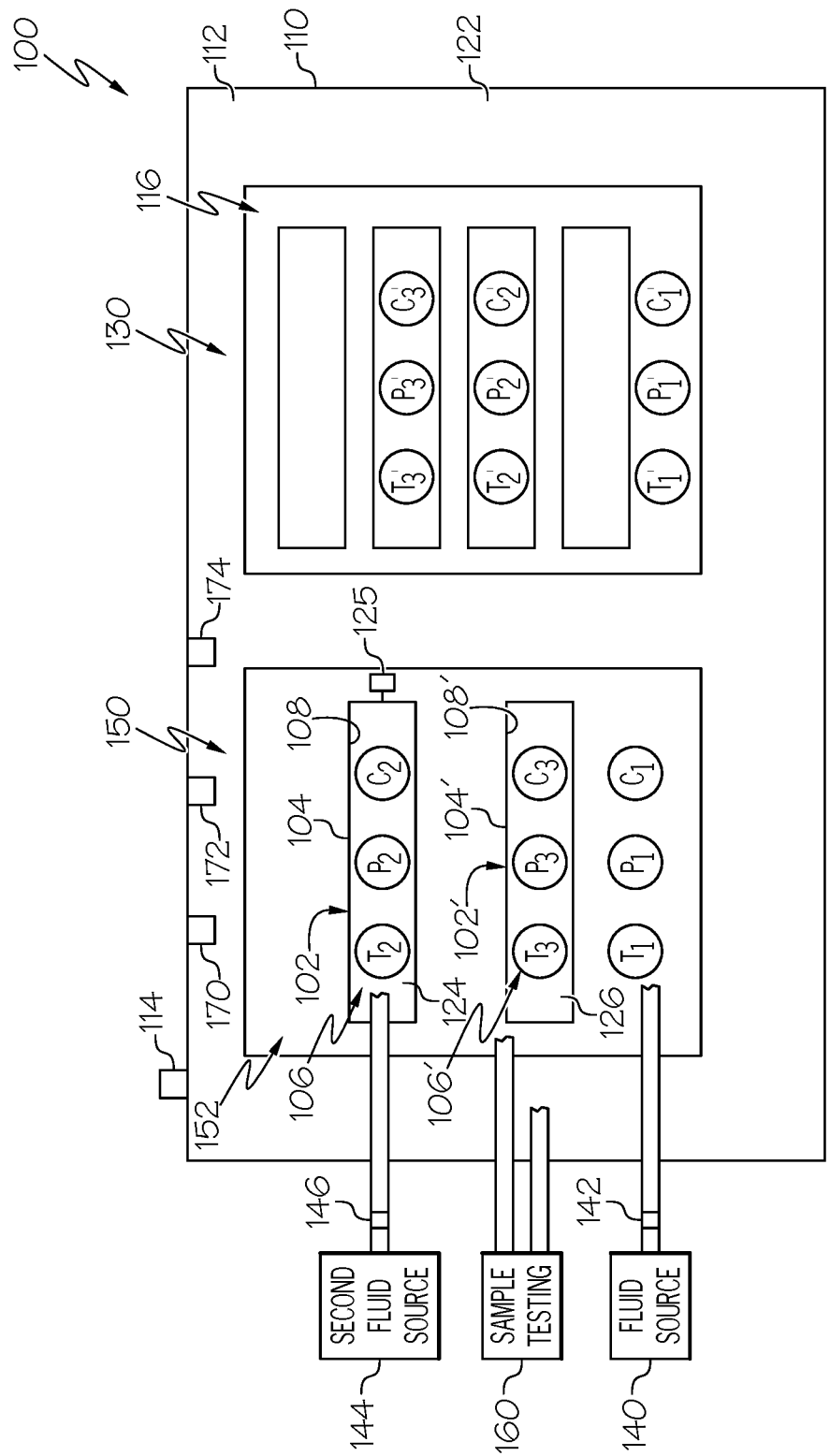
FIG. 2 is a cross-sectional schematic view of a system for concurrently exposing a test specimen to a first environment and a second environment.

Referring to FIG. 2, disclosed is a system 100 for concurrently exposing a test specimen 102 to a first environment 122 and a second environment 124. The test specimen 102 may include any desired material and may be of any shape and configuration that defines an internal volume. In one example, the test specimen 102 comprises a refractory alloy. In another example, the test specimen 102 comprises a nickel-based superalloy. In another example, the test specimen 102 comprises a ceramic. In another example, the test specimen 102 comprises a composite material. In yet another example, the test specimen 102 is tapered, see FIG. 5 and FIG. 6.

The first environment 122 has a first fluid having a first composition $C_1$ at a first temperature $T_1$ and a first pressure $P_1$, and the second environment 124 has a second fluid having a second composition $C_2$ at a second temperature $T_2$ and a second pressure $P_2$. The test specimen 102 has an outside surface 104 to be exposed to the first environment 122 and an inside surface 108 to be exposed to the second environment 124. The inside surface 108 of the test specimen 102 defines an internal volume 106 of the test specimen 102, see FIG. 6. In one example, the first composition $C_1$ is different from the second composition $C_2$.

The system 100 includes a housing 110, see FIG. 2 and FIG. 3. The housing 110 defines a chamber 112. The chamber 112 is configured to receive at least one test specimen 102. In one or more examples, the housing 110 is an autoclave. The system 100 may further include a pressure relief port 114 fluidly coupled with the chamber 112 of the housing 110.

Still referring to FIG. 2, the system 100 includes a first fluid source 140. The first fluid source 140 is fluidly coupled with the chamber 112 of the housing 110 and configured to supply the first fluid to the chamber 112. In one example, the first fluid source 140 comprises at least one of nitrogen and oxygen to provide the first environment 122 with at least one of nitrogen and oxygen. In another example, the first fluid source 140 comprises ambient air. In another example, the first fluid source 140 comprises an inert gas. In another example, the first fluid source 140 comprises a supercritical fluid to provide the first environment 122 with a supercritical fluid. The supercritical fluid may include carbon dioxide. In yet another example, the first fluid source 140 comprises a fluid that yields an acidic pH in the first environment 122.

The system 100 further includes a first pressure control apparatus 142 associated with the first fluid source 140, FIG. 2. The first pressure control apparatus 142 is configured to control, at least partially, the first pressure $P_1$ of the first fluid. In one or more examples, the first pressure $P_1$ is about 1500 psi to about 2500 psi. The first pressure control apparatus 142 is couplable with the first fluid source 140.

Still referring to FIG. 2, the system 100 further includes a second fluid source 144 fluidly couplable with the internal volume 106 of the test specimen 102 to supply the second fluid to the internal volume 106 of the test specimen 102. In one or more examples, the first fluid source 140 and the second fluid source 144 are one and the same.

The second fluid source 144 may include any fluid needed to desired testing parameters. In one example, the second fluid source 144 comprises an inert gas to provide the second environment 124 with an inert gas. In another example, the second fluid source 144 comprises at least one of nitrogen and oxygen to provide the second environment 124 with at least one of nitrogen and oxygen. In another example, the second fluid source 144 comprises a supercritical fluid to provide the second environment 124 with a supercritical fluid. The supercritical fluid may include carbon dioxide. In yet another example, the second fluid source 144 comprises a fluid that yields an acidic pH in the second environment 124.

In one or more examples, the system 100 further includes a second pressure control apparatus 146 associated with the second fluid source 144, FIG. 2. The second pressure control apparatus 146 is configured to control, at least partially, the second pressure $P_2$ of the second fluid. In one example, the second pressure $P_2$ is about 1500 psi to about 2500 psi. In another example, the first pressure $P_1$ is different than the second pressure $P_2$.

Still referring to FIG. 2, the system 100 includes a heat source 150 located in the housing 110. The heat source 150 defines a heated chamber 152 for receiving the test specimen 102. The heated chamber 152 is configured to control, at least partially, the first temperature $T_1$ of the first fluid and the second temperature $T_2$ of the second fluid.

Still referring to FIG. 2, in one or more examples, the heat source 150 may be a furnace. The temperature of the furnace may be automated such that it automatically assumes a desired temperature or may be manually adjusted to a desired temperature. The first temperature $T_1$ may be about 800° C. to about 1000° C. Further, in one example, the second temperature $T_2$ is about 800° C. to about 1000° C. The first temperature $T_1$ may be different than the second temperature $T_2$. In one example, first temperature $T_1$ may be at least 100° C. different than the second temperature $T_2$.

Figure 4:
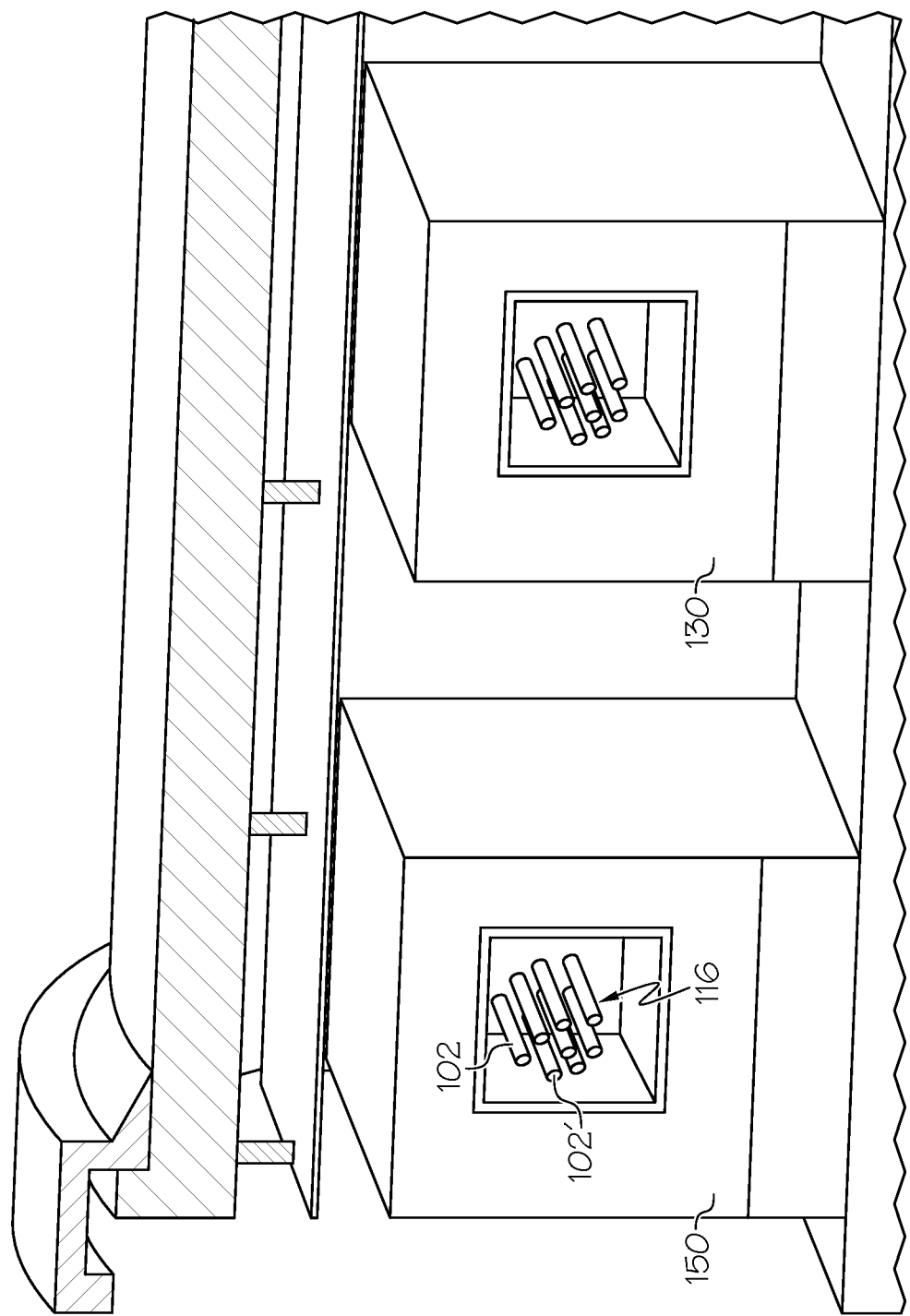
FIG. 4 is a perspective cross-sectional view of a portion of the system for concurrently exposing a test specimen to a first environment and a second environment.

Referring to FIG. 2, the system 100 may further include a second heat source 130 located in the housing 110. In one or more examples, the second heat source 130 is a furnace. The second heat source 130 may include a plurality of test specimens 116 disposed therein, see FIG. 4. The second heat source 130 may have a first temperature $T^1_1$ of the second heat source 130, a first pressure $P^1_1$ of the second heat source 130, and a first composition $C^1_1$ of the second heat source 130.

Still referring to FIG. 2, the system 100 may further include a sample collection apparatus 160. The sample collection apparatus 160 is fluidly coupled with the first environment 122 such that it is configured to draw fluid from the first environment 122 for testing. The sample collection apparatus 160 may also be fluidly coupled with the second environment 124 such that it is configured to draw fluid from the second environment 124 for testing.

In one or more examples, the system 100 further includes a mechanical load 125 couplable with the test specimen 102. The system 100 may include more than one mechanical load 125, each being coupled with a test specimen 102 of a plurality of test specimens 116. In one example, each mechanical load 125 coupled with the plurality of test specimens 116 is the same weight.

Referring to FIG. 2, the system 100 may include at least one sensor to monitor environmental conditions. In one example, the system 100 includes a carbon dioxide sensor 170 in the chamber 112 of the housing 110. In another example, the system 100 includes a temperature sensor 172 in the chamber 112 of the housing 110. In yet another example, the system 100 includes a pressure sensor 174 in the chamber 112 of the housing 110.

Figure 7:
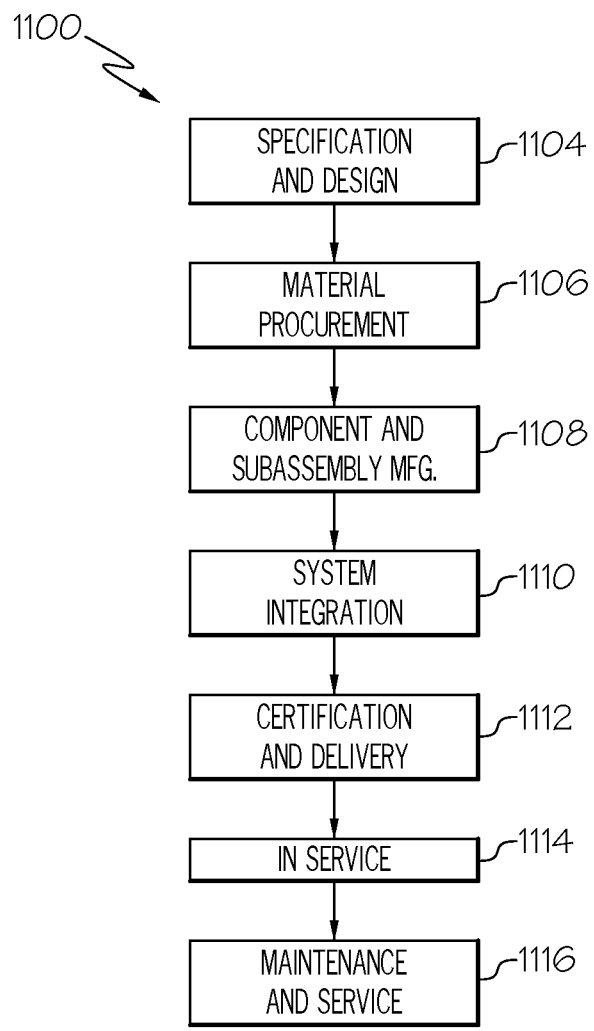
FIG. 7 is a flow chart of aircraft production and service methodology.
Figure 8:
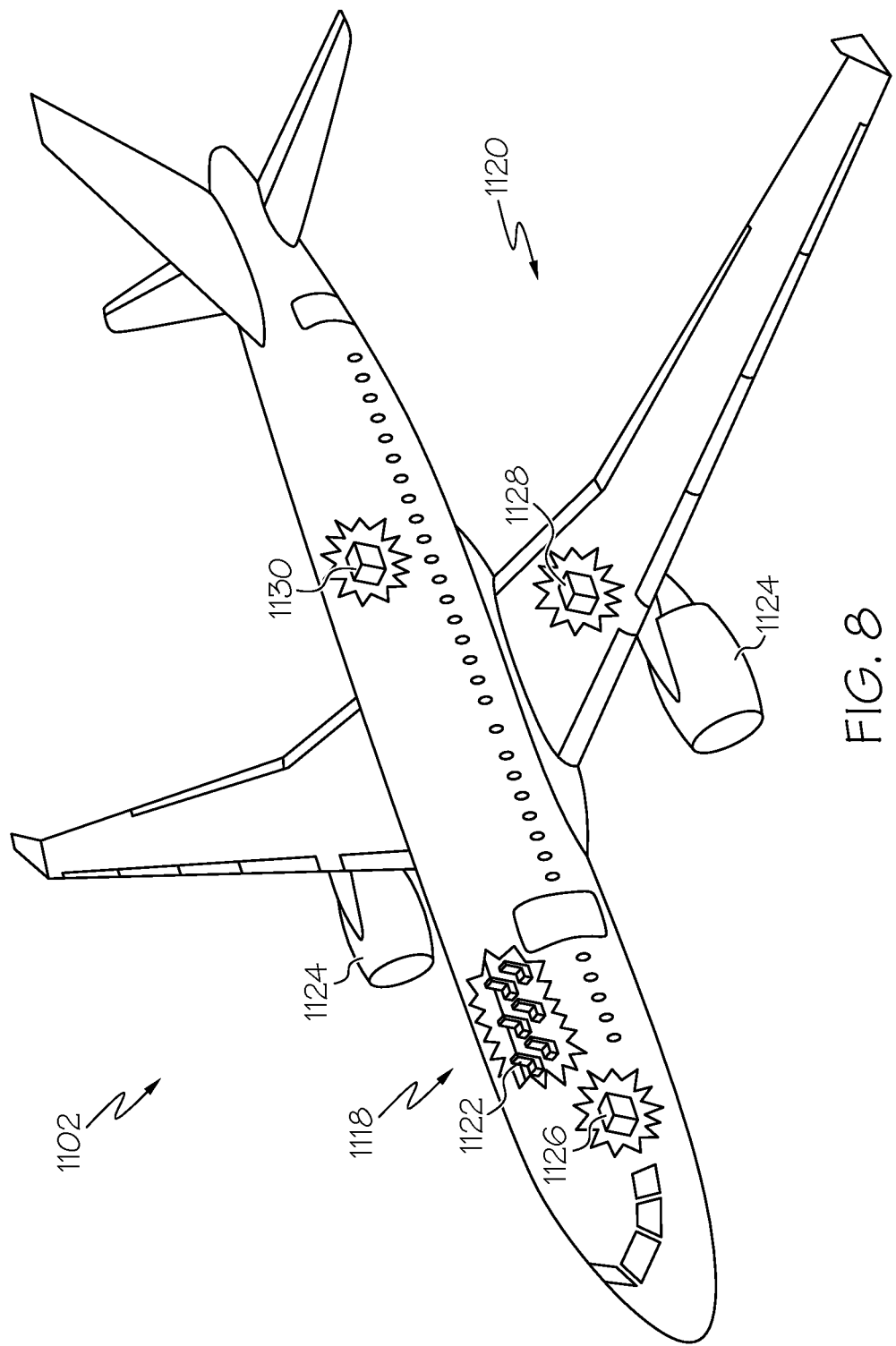
FIG. 8 is a schematic of the aircraft.

Examples of the present disclosure may be described in the context of aircraft manufacturing and service method 1100 as shown in FIG. 7 and aircraft 1102 as shown in FIG. 8. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

System(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the system(s), method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the system(s) and method(s) disclosed herein include a variety of components, features, and functionalities. It should be understood that the various examples of the system(s) and method(s) disclosed herein may include any of the components, features, and functionalities of any of the other examples of the system(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

What is claimed is:

1. A method for concurrently exposing a test specimen to a first environment and a second environment, the test specimen comprising an outside surface and an inside surface, the inside surface defining an internal volume, the method comprising:
    exposing the outside surface of the test specimen to the first environment for a first predetermined period of time, the first environment comprising a first temperature, a first pressure and a first composition;
    exposing the inside surface of the test specimen to the second environment for a second predetermined period of time, the second environment comprising a second temperature, a second pressure and a second composition;
    coupling a mechanical load to the test specimen during the exposing the outside surface of the test specimen and the exposing the inside surface of the test specimen;
    collecting a sample from the first environment;
    qualitative testing the sample from the first environment;
    collecting a sample from the second environment; and
    qualitative testing the sample from the second environment.

2. The method of claim 1, wherein the first temperature is about 800° C. to about 1000° C., the first pressure is about 15 psi to about 2500 psi, and the first predetermined period of time is at least 1000 hours.

3. The method of claim 1, wherein the first environment comprises ambient air.

4. The method of claim 1, wherein the first environment comprises inert gas.

5. The method of claim 1, wherein the second temperature is about 800° C. to about 1000° C., wherein the second pressure is about 1500 psi to about 2500 psi, and wherein the second predetermined period of time is at least 1000 hours.

6. The method of claim 1, wherein the first temperature is different than the second temperature.

7. The method of claim 1, wherein the first pressure is different than the second pressure.

8. The method of claim 1, wherein the second environment comprises supercritical carbon dioxide.

9. The method of claim 1, wherein the first composition is different from the second composition.

10. The method of claim 1, wherein the test specimen comprises a nickel-based superalloy, a refractory alloy, and a composite material.

11. The method of claim 1, further comprising:
    exposing an outside surface of a second test specimen to the first environment for a predetermined period of time; and
    exposing an inside surface of the second test specimen to a third environment for a predetermined period of time, the third environment having a third temperature, a third pressure and a third composition.

12. The method of claim 11, wherein the exposing the outside surface of the test specimen and the exposing the outside surface of the second test specimen are performed concurrently.

13. The method of claim 11, wherein the test specimen and the second test specimen are compositionally different.

14. The method of claim 11, wherein the second composition is different from the third composition.

15. A system for testing materials exposed to extreme conditions, the system comprising:
    a housing defining a chamber;
    a first test specimen received in the chamber, the first test specimen comprising a first outside surface and a first inside surface, the first inside surface defining a first internal volume;
    a second test specimen received in the chamber concurrently with the first test specimen, the second test specimen comprising a second outside surface and a second inside surface, the second inside surface defining a second internal volume;
    a first fluid source fluidly coupled with the chamber of the housing to supply a first fluid to the chamber, the first fluid having a first composition at a first temperature and a first pressure;
    a first pressure control apparatus associated with the first fluid source and configured to control, at least partially, the first pressure of the first fluid;
    a second fluid source fluidly couplable with the first internal volume of the first test specimen to supply a second fluid to the first internal volume of the first test specimen, the second fluid having a second composition at a second temperature and a second pressure;
    a second pressure control apparatus associated with the second fluid source and configured to control, at least partially, the second pressure of the second fluid;
    a third fluid source fluidly couplable with the second internal volume of the second test specimen to supply a second fluid to the second internal volume of the second test specimen, the third fluid having a third composition at a third temperature and a third pressure;
    a third pressure control apparatus associated with the third fluid source and configured to control, at least partially, the third pressure of the third fluid; and
    a heat source located in the housing, the heat source defining a heated chamber for receiving the first test specimen and the second test specimen, wherein the heated chamber is configured to control, at least partially, the first temperature of the first fluid, the second temperature of the second fluid, and the third temperature of the third fluid.

16. The system of claim 15, wherein the housing is an autoclave.

17. The system of claim 15, wherein the first internal volume comprises supercritical carbon dioxide.

18. The system of claim 15, wherein the first test specimen is tapered.

19. A method for testing materials exposed to extreme conditions using a first test specimen and a second test specimen, the first test specimen comprising a first outside surface and a first inside surface, the first inside surface defining a first internal volume, the second test specimen comprising a second outside surface and a second inside surface, the second inside surface defining a second internal volume, the method comprising:
- exposing the first outside surface of the first test specimen to a first environment, the first environment comprising a first temperature, a first pressure and a first composition;
- exposing the first inside surface of the first test specimen to a second environment, the second environment comprising a second temperature, a second pressure and a second composition;
- exposing the second outside surface of the second test specimen to the first environment; and
- exposing the second inside surface of the second test specimen to a third environment, the third environment comprising a third temperature, a third pressure and a third composition,
- wherein the exposing the first outside surface, the exposing the first inside surface, the exposing the second outside surface, and the exposing the second inside surface are performed concurrently.

20. The method of claim 15, wherein the second environment comprises supercritical carbon dioxide.

* * * * *